Nov. 25, 1947.　　　　G. STEVENS　　　　2,431,517
METHOD OF MAKING SAW BLADES
Filed March 31, 1943

Inventor
GEORGE STEVENS,
By John Howard Joynt
His Attorney

Patented Nov. 25, 1947

2,431,517

UNITED STATES PATENT OFFICE 2,431,517

METHOD OF MAKING SAW BLADES

George Stevens, Baltimore, Md., assignor, by mesne assignments, to The American Rolling Mill Company, Middletown, Ohio, a corporation of Ohio Application March 31, 1943, Serial No. 481,335

2 Claims. (Cl. 76—112)

1

My invention relates to the cutting of stainless steel, and to a saw suited to cutting such steel.

One of the objects of my invention is the provision of a simple, efficient and rapid method of cutting or sawing stainless steel ingot, billet, bar, plate or like stock with uniformly good results.

Another object is the provision of a method for making or adapting a saw to the rapid and reliable cutting of stainless steel.

A further object of my invention is the provision of a saw which is efficient and durable and well adapted to the cutting of mixed grades of stainless steel, all in a minimum of time and with maximum life of saw blade.

Other objects in part will be obvious and in part pointed out hereinafter.

Figure 1:
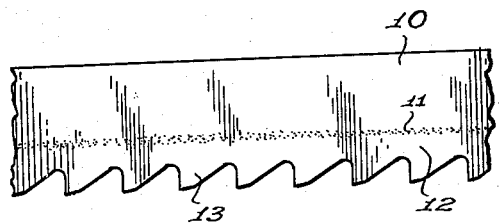
Figure 2:
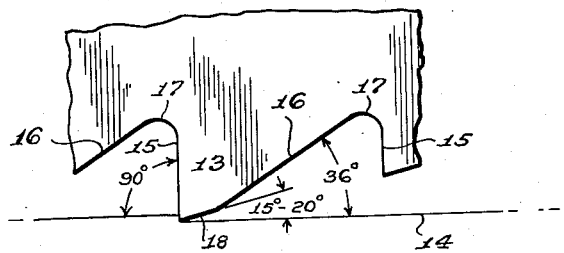

In the accompanying drawing:

Figure 1 is a side view of a blade illustrating certain features of my invention, and Figure 2 is an enlarged view of a portion of the blade of Figure 1.

Like reference characters denote like parts throughout the drawing.

In order to more easily understand certain features of my invention, it may be noted at this point that for many years it has been customary practice to construct saws for cutting hard and tough steels of what, for all practical purposes, may be termed composite construction. One part comprises a tool steel working section of comparatively small depth. This part is backed by a mild steel backing, usually of considerably larger dimensions. The working and backing parts are usually welded together. This composite construction is employed inasmuch as the high cutting qualities of the tool steel sections are required only at the cutting edge. There is no necessity of constructing the entire saw blade of this comparatively expensive material. Indeed, the mildness of the carbon steel backing has the advantage of imparting some ductility and pliancy to the blade in actual use. This composite construction is particularly suited for the production of saw blades for reciprocating use.

The tooth construction of the convential reciprocating saw blade, particularly such as is employed in cutting the tough metails aforesaid, is well known in the art. Each of the plurality of teeth of the saw blade has a leading edge making approximately a 90° angle with the work surface which edge leads into the work stock during cutting. This leading edge meets the lagging edge, or that edge of the tooth which trails dur-

2 ing the working stroke of the blade to form the tooth tip or point. The trailing edge customarily is disposed at an angle to the work surface sufficient to ensure ready clearing of chips attendant upon the cutting operation. The angle of this edge to the work surface which has been found to be most satisfactory is 36°, although a latitude of a few degrees either way is entirely permissible. At the rearmost extent of this lagging edge, which of course is considerably removed from the region of cutting, it is led gradually in a continuous curve into the topmost edge of the leading edge of the immediately following tooth. This continuous curvature facilitates clearing away the material cut in the bite of the saw, and tends to prevent jamming during the cutting operation.

To impart proper temper to saw blades of this general type it is customary practice after the two component parts thereof are welded together to subject the blade to a heat treatment in a controlled atmosphere. This tends to rectify any drawing of temper which may have attended the welding operation and to impart just the correct temper and degree of hardness to the tool steel cutting portion of the saw to adapt it for its intended purpose. Without this final tempering operation, the saw is not adapted for its work.

The disadvantage has been encountered, however, that blades produced according to the foregoing technique possess many defects which are particularly serious in the cutting of stainless steel, when measured from a practical standpoint. Although these blades are capable of taking a sharp edge during the sharpening process, and are quite sharp and cut easily during the first few passes over the work stock, when cutting stainless steel they soon lose this initial sharpness, and thereafter display comparative dullness throughout the remainder of their life, up to ultimate failure. Intensive investigation finally revealed that this dullness resulted from microscopic failure or breaking off of the very points of the cutting edges of the teeth at the junction of the leading and trailing edges thereof. A flat, dull surface followed upon this breakage, usually substantially parallel to the blade axis but sometimes at a random or indeterminate slight angle with respect thereto. While these flat surfaces are of small dimensions, it is upon them that the pressure of the saw is exerted during its cutting stroke. This means that the cutting operation is carried out with a dull cutting edge. Slow cutting speeds result. Short blade life is observed. Moreover, it developed that in particular, short blade life follows upon cutting metals of mixed grade, as for example, first cutting mild steels, then harder alloys, and then again cutting mild steels, all with the same blade. Early failure attends upon such use.

An important object of my invention, therefore, is to produce a saw blade which is simple and inexpensive, which can be readily produced with but a minimum of change or modification of the present-day blade, which has long useful life, which is capable of maintaining a high degree of sharpness throughout its entire life span, which can be readily resharpened should the cutting edge become dulled, which possesses high cutting speed, and which cuts mixed steels and metals with facility, displaying both high-cutting speed and long life.

In accordance with my invention, I have found that with a redesign of the saw blade, slight in itself, the blade thus produced displays outstandingly improved qualities, both from the standpoint of useful life and of cutting speed. I accomplish my objectives by imparting to each blade tooth adjacent the tip defined by the junction of the leading and lagging edges, what I very aptly designate a purposeful cutback. This purposeful cutback largely is the change in construction which gives rise to my superior results. By purposeful cutback I designate a cutback at the very tip of each tooth of the blade. This provides a complementary edge of very short length.

It is important to note that the cutback provided is at an angle to the blade axis. I find that for the blade to display the desired good qualities, this angle of cutback is highly critical. In short, I find that the angle which this purposeful cutback must make with the blade axis is at least 15° before the high and enduring sharpness, high-cutting speed and long useful life which characterize my invention are displayed. Moreover, during practical tests, it was observed that these desirable traits appeared suddenly and abruptly when the aforesaid critical angle was reached. Similarly, these tests demonstrated that when the angle of inclination exceeded about 20°, these desirable qualities diminished with almost the same abruptness with which they appeared. Decrease in blade life was observed, along with decrease in cutting speed, when this maximum angle was exceeded. Accordingly, there appears to be what may aptly be termed a narrow range of optimum good qualities ranging from 15° to about 20° with respect to the blade axis.

Although I am unable to explain the reason for the critical character of my blade, certain of its beneficial properties come from the assurance of a strong, tough tooth tip.

Thus, upon study of the problem of increasing life of saw blades, it occurred to me that some connection exists between the final heat treatment hereinbefore referred to, and the short life span of the known blades. Further investigation led to the conclusion that the inherent weakness displayed at the tips of the teeth of these blades follows upon a process of decarburization attendant upon the heat treatment, in spite of the controlled atmosphere. This decarburization, which apparently is not practically avoidable, leaves the metal of the tips without the required carbon bond. In their weakened condition the tips are readily susceptible to failure after but a few working strokes of the blade. The flattened, dull tip portions result, causing the drastic decrease in sharpness heretofore referred to. This result is avoided in the blade of my invention.

Referring now more particularly to the illustrative embodiment of my invention disclosed in Figures 1 and 2, I employ a saw blade consisting of a backing 10 of mild carbon steel, to which is welded or otherwise secured along line 11 a working section 12 of high speed tool steel. This working section 12 has disposed at the edge thereof a plurality of like cutting teeth 13.

In Figure 2 are shown on enlarged scale the details of one of the teeth 13, the tooth being shown, for clarity of illustration, as applied to a piece of work stock 14 such as a billet, bar or the like through which a cut is to be made. Each tooth 13 comprises a front or leading edge 15 disposed at an angle of about 90° with the blade axis and with the work. A lagging edge 16 of some length slants upward and rearwardly. This edge preferably is disposed at an angle of about 36° with the blade axis. Gradually and continuously curved arches or vaulted portions 17 connect the lagging edge 16 of each tooth with the leading edge 15 of the next subsequent tooth. The angle at which these lagging edges 16 are set with respect to the blade axis and the curvature of the edges 17 are selected empirically according to conventional practice, so that chips, curls, etc., as they are cut from the metal stock will be readily eliminated. Jamming of the saw blade is minimized.

The purposeful cutback heretofore referred to, which gives rise to such surprising and advantageous results, is provided at the junction of the leading and lagging edges 15 and 16 of each tooth. The sharp point or tip at which those two edges ordinarily would meet is eliminated. In its stead, a new tip is established by leading edge 15 and the third edge 18, which in practice constitutes the actual tip of the tooth. This edge forming the back of tip 18 must be provided at an angle to the blade axis which while slight, is quite critical as has already been pointed out, and which must be definite to give rise to the required good results. My experimental work demonstrated conclusively that this angle must never be less than 15°, while the advantages attendant thereupon disappear rapidly when the angle exceeds 20° even by a very slight amount.

A saw blade embodying my new invention is particularly suited for use as a part of a reciprocating saw. In the cutting of stainless steel bars or billets, for example, and when a sulphur-base oil is employed as a lubricant as is usually the case, my new blade displays surprisingly high cutting speed, together with long blade life.

With the known type of blades heretofore in use, a satisfactory degree of sharpness is encountered only during the first few working strokes. Thereafter the sharpness diminishes appreciably in rapid fashion. As suggested hereinbefore, my studies of this phenomena develop that the microscopic cutting tips of the teeth were broken away, leaving only a dull, broken cutting surface. Furthermore, no real success was experienced in resharpening these blades, a phenomenon in all probability attributable to the initial failure and breaking of the cutting tips.

Quite on the contrary, my new saw blade not only displays high initial sharpness, giving rise to high cutting speed at the outset, but this high cutting speed remains substantially constant over a long period of use. Moreover, it is entirely feasible to resharpen the blade when it finally does become dull. This is probably due to the fact that the metal of the cutting tip remains substantially intact and undamaged during use, the tip being subjected to comparatively little microscopic breaking and loss of metal. The new blade is particularly suited for cutting bars or billets of stainless steel, as well as other alloy steels and alloys. For metals of this type, I find it advisable to use high blade pressure on the metal stock, together with a slow, steady stroke. When my new saw blade is employed, a reduction in cutting time of such metals is observed ranging from 15% to 25% of that required with the conventional saw blade.

Moreover, the long useful life at high cutting speeds is amply demonstrated in cutting the 18-8 chromium-nickel stainless steel, the sulphur-bearing 18-8 chromium-nickel steel, the columbium-bearing and molybdenum-bearing 18-8 chromium-nickel steels, and the straight chromium grades of stainless steel. To illustrate, in one test upon a particularly tough steel, (18-8 chromium-nickel steel billets 8" x 8"), 2025 square inches of metal were cut in 33 hours before blade failure. In another test, involving a somewhat less tough stainless steel, (16-2 chromium-nickel steel), 2129 square inches of billet were cut in 27 hours without failure of the blade. This is notably in contrast with the conventional hack-saw blade where a maximum of about 750 square inches of billets of the even less tough 16% chromium grade may be cut before blade failure, breakage occurring in 10 to 12 hours. In cutting the tough chromium-molybdenum stainless steel, my blade has a life of about 29 hours as compared with a life of 5 hours for the known blade.

A very important advantage of my invention is that the blade gives entirely satisfactory performance when cutting a variety of steels. The difficulty is frequently experienced when using the ordinary blade, for example first on steels which are easy to cut, then on harder steels and back again to the easy steels, that the blade soon breaks, requiring replacement. This quickly adds to the cost of processing the metal stock. While the underlying cause of this detrimental phenomena is not definitely known, my investigations lead me to the belief that quite possibly it may result from some re-adjustment of the metal of the blade tips as an incident to cutting each of the steel grades. It is by no means certain, however, that this is the correct explanation, and I do not desire to be bound to this theory.

My new blade, however, readily adapts itself to different types of steels when used in cutting mixed grades. There is little decrease in the speed of cutting any one of the variety of metals from that observed when cutting that metal alone. No substantial decrease in the blade life is observed. In short, the new blade cuts mixed grades of metal, and single grades with almost equal facility.

A point of considerable practical novelty is that, where desired, my new invention may be practiced with ordinary hack-saw blades already on the market. For example, only 1½ minutes are required to condition a 24 inch blade according to my new teaching.

Moreover, my invention consists in part of passing across the surface of the metal stock a series of cutting surfaces independently set at an angle of about 15° to 20° with the surface being cut.

Thus it will be seen that I have provided a saw blade and method in which the various objects hereinbefore set forth are successfully achieved. It will readily be appreciated that by comparatively simple yet radical change in design, involving an entirely new inventive concept, I produce a new reciprocating saw blade possessing numerous entirely novel and important advantages. My new saw blade is particularly adapted for cutting the tougher alloy steels and alloys. In the austenitic chromium-nickel stainless steel, rapid cutting speed is accompanied by a minimum of work-hardening. Long blade life is achieved. This rapid cutting speed is retained at substantially constant value throughout long intervals of actual use. The blade may be resharpened several times to improve its efficiency and prolong its life somewhat. Mixed grades of steel may be cut with a single blade with satisfactory speed and comparatively long blade life.

I claim:
1. In producing a reciprocating saw blade for stainless steel, the art which comprises, making a blade having teeth with leading edges at substantially 90° and lagging edges at substantially 36° with the blade axis, hardening the blade by heat treatment, and following the hardening operation cutting off the metal of the tips of the hardened teeth so as simultaneously to remove decarburized areas and form a relief angle of at least 15° and not over 20° with the blade axis.

2. In producing a saw blade, the art which comprises making a tool steel blade having teeth with lagging edges at greater than 20° with the blade axis, hardening the blade by heat treatment, and following the hardening operation cutting off the metal tips of the hardened teeth so as simultaneously to remove decarburized areas and form a relief angle of at least 15° and not over 20° with the blade axis.

GEORGE STEVENS.

REFERENCES CITED

The following references are of record in the file of this patent:

UNITED STATES PATENTS

| Number | Name | Date |
|---|---|---|
| 1,945,535 | Schlitz | Feb. 6, 1934 |
| 72,983 | Davis | Jan. 7, 1868 |
| 907,167 | Neill | Dec. 22, 1908 |
| 2,285,315 | Thompson | June 2, 1942 |
| 301,841 | Troeme-Becker | July 8, 1884 |
| 453,431 | Schmaltz | June 2, 1891 |
| 103,726 | Douglas | May 31, 1870 |
| 1,217,889 | Brust | Feb. 27, 1917 |
| 1,954,535 | Olsson | Apr. 10, 1934 |

FOREIGN PATENTS

| Number | Country | Date |
|---|---|---|
| 119,275 | Switzerland | Mar. 1, 1927 |
| 495,947 | Great Britain | Nov. 22, 1938 |